McKENDRIE A. SPRAGUE.
CAR FENDER.
APPLICATION FILED JUNE 27, 1910. RENEWED JULY 9, 1913.

1,086,001.

Patented Feb. 3, 1914.

2 SHEETS—SHEET 1.

Witnesses:
Elmer E. Green.
L. J. Gorin.

Inventor
McKendrie A. Sprague
per Fred P. Gorin

Attorney

McKENDRIE A. SPRAGUE.
CAR FENDER.
APPLICATION FILED JUNE 27, 1910. RENEWED JULY 9, 1913.

1,086,001.

Patented Feb. 3, 1914.

2 SHEETS—SHEET 2.

Witnesses
Elmer E. Green
L. J. Gorin

Inventor
McKendrie A. Sprague
per Fred P. Gorin
Attorney

UNITED STATES PATENT OFFICE.

McKENDRIE A. SPRAGUE, OF SEATTLE, WASHINGTON.

CAR-FENDER.

1,086,001.  Specification of Letters Patent.  Patented Feb. 3, 1914.

Application filed June 27, 1910, Serial No. 569,164. Renewed July 9, 1913. Serial No. 778,224.

*To all whom it may concern:*

Be it known that I, McKENDRIE A. SPRAGUE, a citizen of the United States, and a resident of Seattle, in the county of King and State of Washington, have invented certain new and useful Improvements in Car-Fenders, of which the following is a full, true, and exact specification.

This invention relates to car fenders and has for its principal object to provide a fender readily attachable to the car, simple and strong in its construction, and not easily put out of order.

Other objects will appear as the invention is more fully disclosed.

I attain these ends by means of the novel construction, combination and arrangement of the parts as will be hereinafter fully described and claimed, and shown in the accompanying drawings, in which—

Figure 1:
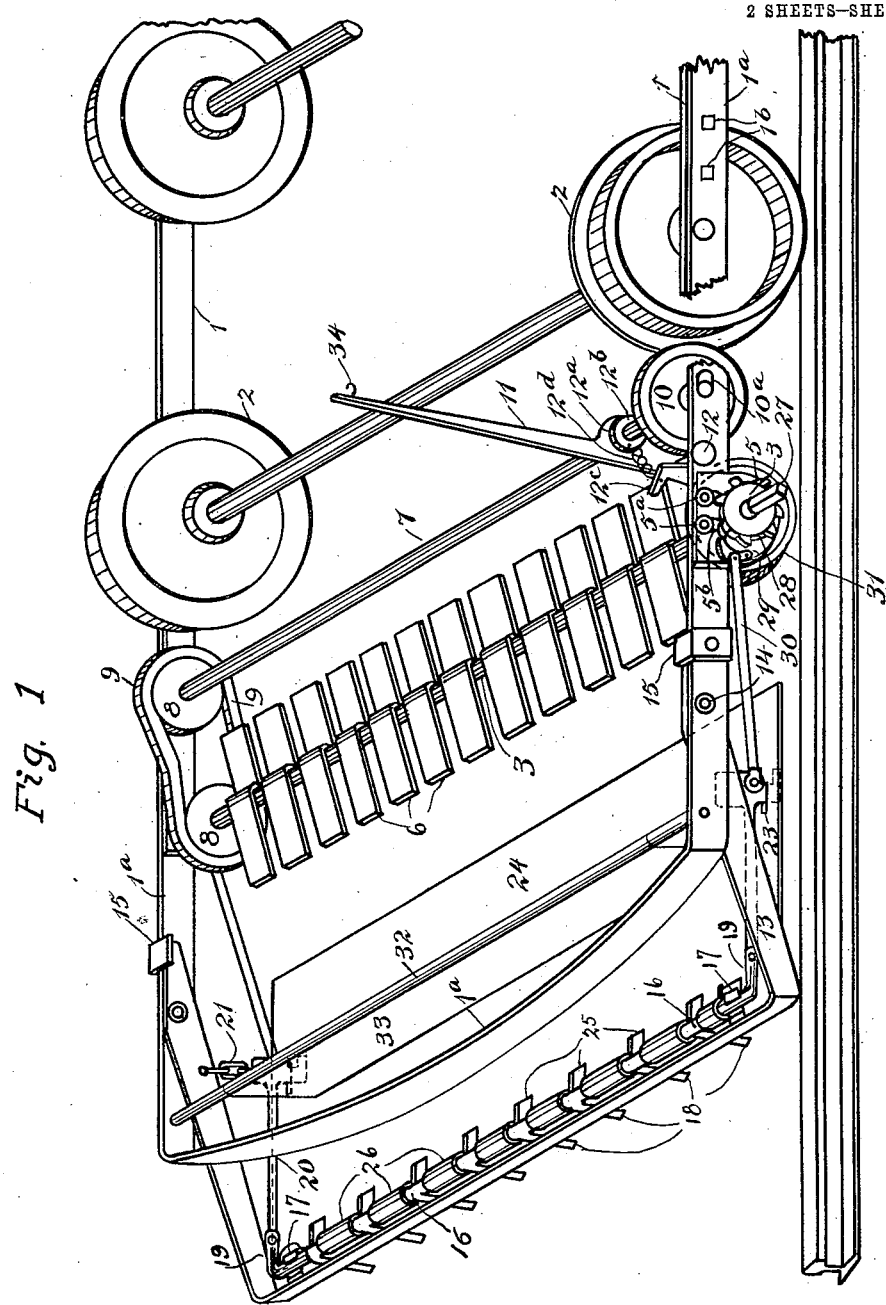
Figure 2:
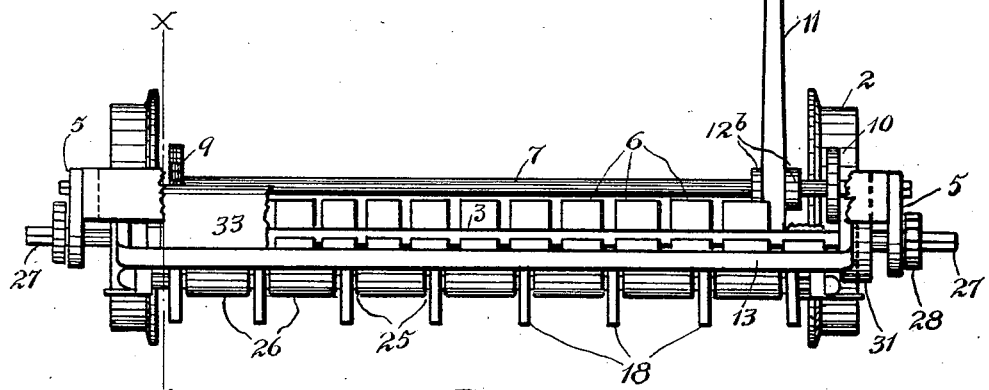
Figure 3:
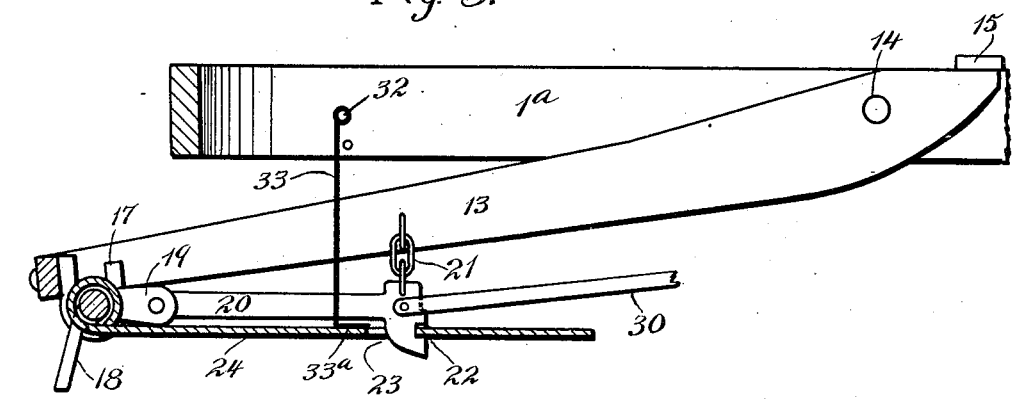

Figure 1 is a perspective view of the forward end of the running gear of a car of ordinary construction equipped with my improved fender, with the rear portion of the running gear, and part of the side thereof, broken away. Fig. 2 is a front elevation, with the apron partly broken away, and the pawl and link connections removed. Fig. 3 is a sectional detail view, enlarged, taken on the line $x$ $x$ of Fig. 2.

The reference character 1 designates the main frame of the running gear of the car of substantially ordinary construction, 2 the wheels of the car, 3 a shaft having the radial projections, 6 and revolubly mounted in the brackets 5 secured to the frame 1 by the bolts $5^a$, the openings $5^b$ in the brackets 5 being slightly elongated to permit of vertical adjustment of the same if required. The wheels 8 are secured to the shafts 3 and 7 respectively, over which passes the endless belt 9. To the shaft 7 is secured the wheel 10 normally out of engagement with the car wheel 2. The bearings $10^a$ in which are mounted the ends of the shaft 7 are slightly elongated to allow some lateral movement of the shaft. The lever 11 is pivotally mounted upon the pin or stud 12, and has the eye $12^a$ through which passes the shaft 7, the washers $12^b$ holding the lever against lateral movement upon the shaft 7. A spring $12^d$ may connect the bracket $12^c$ and the lever 11 to hold the wheel 10 out of engagement with the wheel 2. $1^a$ is a U-shaped frame secured to the main frame 1 of the running gear by the bolts $1^b$.

13 is a bail pivotally mounted upon the U-shaped frame $1^a$ at 14, on which is the limit stop 15 to limit the movement of the bail in a downward direction.

16 is a rock shaft loosely mounted in the hangers 17 upon the bail 13, and having secured thereto the downwardly projecting fingers 18, and having its ends bent at right angles, forming the arms 19, to which are connected the links 20, which extend rearwardly and have their rear ends suspended by the chain 21 attached to the bail 13. In the lower portion of the rear ends of the links 20 are the notches 22, in which normally lie portions of the platform 24 adjacent the openings 23 therein. The platform 24 is slotted as at 25, to receive the fingers 18 of the rock shaft 16, around which the outer edge of the platform 24 is loosely wrapped, as at 26, forming a hinge connection therewith. The projecting ends 27 of the shaft 3 are angular, and adapted to be fitted with a suitable crank. Secured to the shaft 3 are the ratchet wheels 28, having the pawl 29 pivoted to the bracket 5. The pawl 29 is pivotally connected, (by the link 30) to the link 20. The spring drum 31 is secured to the frame $1^a$. Within the drum 31 is a suitable spring $31^a$ having one of its ends attached to the drum and its opposite end attached to the shaft 3. It is understood that the spring in the drum 31 is kept under tension, except when released in an emergency, presently to be described. Suspended from the rod 32 is the apron 33, preferably of flexible material, having its bottom edge attached to the platform 24, but of sufficient length to allow the platform 24 to drop to the level of the track when disengaged from the notch 22. The slack in the apron is shown at $33^a$, Fig. 3, the bottom edge lying flat upon the platform 24.

34 is a hook, from which, if desired, may be suspended a suitable weight to hold the shaft 7 in its rearward shifted position to keep the wheels 10 and 2 in constant operative engagement with each other.

From the above description it is clear that the impact with the fingers 18 of an obstruction upon the car track, while the car is in motion, would cause the shaft 16 to revolve in its bearing 17, rock the arms 19 upwardly, drawing the links 20 and 30 forward, releasing the platform 24 from engagement with the notches 22, and withdrawing the pawl 29 from its engagement with the ratchet wheel 28, allowing the shaft 3 to revolve under the tension of its spring. By this time the car has moved forward some distance, the platform 24 has passed yieldingly over the obstruction, bringing the now revolving radial arms 6 into contact therewith, the rotary motion of which arms causing the obstacle to be thrown safely forward against the apron 33 and upon the platform 24. The free end of which platform having now dropped to the level of the track the obstacle is prevented from being thrown under the platform. The lever 11 may, at the near approach of an obstacle, be operated by the driver or other occupant of the car, to move the shaft 7 rearwardly in its slotted bearings 10ª, bringing the wheel 10 into operative contact with the car wheel 2 and thereby transmitting the motion of the latter to the shaft 7 and through its connections to the shaft 3 and radial arms 6.

While the spring in the drum 31 is kept under tension and so held by the pawl 29, except when automatically tripped as above described, it will nevertheless be understood that the spring is never wound to its limit in setting the same, so that in case the lever 11 be operated to throw the wheel 10 into engagement with the wheel 2 the shaft 3 may complete quite a number of revolutions before winding the spring completely to its limit, the car, in the mean time, having been brought to a stop before the limit of expansion of the spring has been reached, thus avoiding breakage of the same, after which the pawl 29 may be lifted out of its tooth, the spring unwound and set as before.

While I have shown a bail 13, pivotally mounted upon the frame 1ª, so that the platform 24 may be positioned with its forward edge close to the track and still yieldingly pass over obstacles of various bulks, it will, nevertheless, be understood that the bail 13 may be rigidly secured to the frame 1ª, and that in any case, a body falling upon the top of the platform 24 instead of passing thereunder, would likely be caught against the front side of the apron 33, thus saving it from serious damage; failing in which, however, the radial projections 6, set in motion by the driver or other occupant of the car, by means of the lever 11, would thereafter contact with the obstacle and throw it safely forward upon the platform and against the yielding apron 33.

While the platform 24 is shown and described as being normally held up or suspended from the car track, it is obvious that, while desirable, this is not an essential feature of the invention, as the platform 24 might be left to drag upon the track, and, aside from the resultant vibration and noise, would perform its required function.

While I have shown a fender mechanism compactly mounted in its independent frame, easily attachable to the car, or other vehicle, it will be understood that the same could be built into the car proper as an integral part thereof.

While I have shown a particular form of embodiment of my invention, I am fully aware that many changes may suggest themselves to others skilled in the art without departing from the spirit and scope thereof, and I do not, therefore, wish to be limited to the exact form herein shown and described.

Having described my invention, what I claim as new and desire protection by Letters Patent, is—

1. The combination with a vehicle of a fender mechanism including a frame, a shaft having radial projections, revolubly mounted with relation to said frame; means mounted in the frame and operated by the movement of the vehicle; power transmission connections between said means and the shaft whereby the latter is rotated; a bail mounted upon the frame; a platform having one of its sides pivotally mounted upon the bail and an apron intermediate the frame and the platform, substantially as shown, as and for the purpose set forth.

2. The combination with a vehicle of a fender mechanism including a detachable frame, a shaft, having radial projections, revolubly mounted with relation to said frame; means mounted in the frame and operated by the movement of the vehicle, but normally out of operative engagement therewith; means under the control of an occupant of the vehicle, for throwing the first named means into operative engagement with the vehicle; power transmission connections between the first named means and the shaft, whereby the latter is rotated; a bail mounted upon the frame; a platform having one of its sides pivotally mounted upon the bail and an apron intermediate the frame and the platform, substantially as shown, as and for the purpose set forth.

3. The combination with a vehicle of a fender mechanism including an adjustable frame, a shaft, having radial projections, revolubly mounted with relation to said frame; a motor for the shaft having a movement independent of the vehicle; means for normally holding the shaft against rotation; a bail mounted upon the frame; a platform having one of its sides pivotally mounted upon the bail, and means for retaining the platform in a substantially horizontal plane beneath the frame and means located adjacent the forward portion of the platform to simultaneously shift the platform retaining means and the shaft holding means, whereby the inner edge of the platform is lowered to the track and the shaft set in motion, substantially as shown, as and for the purpose set forth.

4. The combination with a vehicle of a fender mechanism, including a frame, a shaft, having radial projections, revolubly mounted with relation to said frame; means adapted to be continuously rotated during the movement of the vehicle; power transmission connections between said means and the shaft whereby the latter is rotated; a bail mounted upon the frame; a platform pivotally mounted upon the bail and an apron intermediate the frame and the platform, substantially as shown as and for the purpose set forth.

McKENDRIE A. SPRAGUE.

Witnesses:
M. E. BREWER,
F. P. GORIN.

Copies of this patent may be obtained for five cents each, by addressing the "Commissioner of Patents, Washington, D. C."